(12) United States Patent
Jiao et al.

(10) Patent No.: US 8,269,792 B2
(45) Date of Patent: Sep. 18, 2012

(54) EFFICIENT SCISSORING FOR GRAPHICS APPLICATION

(75) Inventors: Guofang Jiao, San Diego, CA (US); Angus M. Dorbie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1279 days.

(21) Appl. No.: 11/562,379

(22) Filed: Nov. 21, 2006

(65) Prior Publication Data

US 2008/0118148 A1    May 22, 2008

(51) Int. Cl.
    *G06T 11/00* (2006.01)
(52) U.S. Cl. ........................................................ 345/620
(58) Field of Classification Search .................. 345/620, 345/625–628
    See application file for complete search history.

(56) References Cited

U.S. PATENT DOCUMENTS

| | | | |
|---|---|---|---|
| 3,800,292 A | 3/1974 | Curley et al. |
| 4,297,743 A | 10/1981 | Appell et al. |
| 4,380,066 A | 4/1983 | Spencer et al. |
| 4,432,051 A | 2/1984 | Bogaert et al. |
| 5,530,665 A | 6/1996 | Yoneda |
| 5,615,729 A | 4/1997 | Matsumoto et al. |
| 5,774,600 A | 6/1998 | Strongin et al. |
| 5,951,676 A | 9/1999 | Henry et al. |
| 5,956,748 A | 9/1999 | New |
| 6,021,121 A | 2/2000 | Heinrich |
| 6,151,618 A | 11/2000 | Wahbe et al. |
| 6,880,068 B1 | 4/2005 | McGrath |
| 2006/0055702 A1 | 3/2006 | Hall |

FOREIGN PATENT DOCUMENTS

| | | |
|---|---|---|
| JP | 2018685 A | 1/1990 |
| JP | 11025286 A | 1/1999 |
| JP | 2001134777 A | 5/2001 |
| JP | 2004013202 A | 1/2004 |

OTHER PUBLICATIONS

Mark J. Kilgard, Improving Shadows and Reflections via the Stencil Buffer, Oct. 14, 2005, http://artis.inrialpes.fr/Recherche/RealTimeShadows/pdf/stencil.pdf, pp. 1-50.*

(Continued)

*Primary Examiner* — Jeffrey A Brier
(74) *Attorney, Agent, or Firm* — George C. Pappas; James R. Gambale, Jr.

(57) ABSTRACT

Scissoring for any number of scissoring regions is performed in a sequential order by drawing one scissoring region at a time on a drawing surface and updating scissor values for pixels within each scissoring region. A scissor value for a pixel may indicate the number of scissoring regions covering the pixel and may be incremented for each scissoring region covering the pixel. A scissor value for a pixel may also be a bitmap, and a bit for a scissoring region may be set to one if the pixel is within the scissoring region. Pixels within a region of interest are passed and rendered, and pixels outside of the region are discarded. This region may be defined by a reference value, which may be set to (a) one for the union of all scissoring regions, for a scissoring UNION operation, or (b) larger than one for the intersection of multiple (e.g., all) scissoring regions, for a scissoring AND operation.

28 Claims, 7 Drawing Sheets

OTHER PUBLICATIONS

Morgan McGuire, John F. Hughes, Kevin T. Egan, Mark J. Kilgard, and Cass Everitt, Fast, Practical and Robust Shadows, Nov. 6, 2003, http://people.csail.mit.edu/ericchan/bib/pdf/fastShadows.pdf, pp. 1-25.*

OpenVG Overview—Vector Graphics Acceleration, Aug. 25, 2005, Internet Archive of http://www.khronos.org/openvg/ , pp. 1-8.*

Ren Huang and Soo-Ik Chae, Implementation of an OpenVG Rasterizer with Configurable Anti-aliasing and Multi-window Scissoring, Sep. 2006, IEEE, The Sixth IEEE International Conference on Computer and Information Technology, 2006, CIT '06, pp. 1-6.*

International Preliminary Report on Patentability form PCT/IPEA/409 dated Apr. 14, 2009 for PCT/US2007/085241.*

International Search Report—PCT/US07/085241—International Search Authority, European Patent Office—Jul. 10, 2008.

Written Opinion—PCT/US07/085241—International Search Authority, European Patent Office—Jul. 10, 2008.

Anonymous, "Clipping in OpenGL—Version 2," [Online] Sep. 14, 1999.

Hwanyong Lee, "OpenVG Overview," Dec. 31, 2005.

Anonymous, "OGL: use depth buffer instead of stencil for non rectangular clipping," Aug. 21, 2005, pp. 1-2.

MichelBeaudouin "The Architecture and Implementation of CPN2000, A Post-WIMP Graphical Application," Application in Proceedings of ACM Symposium User Interface Software and Technology (UIST2000), Nov. 2000. Windowing and Clipping.

Taiwan Search Report—TW096144128—TIPO—May 7, 2011.

Partial European Search Report, EP1983424, Search Division, European Patent Office, The Hague, Nov. 8, 2008.

Partial International Search Report, PCT/US2008/060793, International Searching Authority, European Patent Office, Nov. 7, 2008.

* cited by examiner

EFFICIENT SCISSORING FOR GRAPHICS APPLICATION

BACKGROUND

I. Field

The present disclosure relates generally to electronics, and more specifically to techniques for performing scissoring for graphics applications.

II. Background

Graphics processing units (GPUs) are specialized hardware units used to render 2-dimensional (2-D) and 3-dimensional (3-D) images for various applications such as video games, graphics, computer-aided design (CAD), simulation and visualization tools, imaging, etc. A GPU may perform various graphics operations such as shading, blending, etc. to render a drawing or image. These graphics operations may be computationally intensive. To reduce computation, the drawing may be clipped to the bounds of the drawing surface. The drawing may further be clipped to the interior of one or more scissoring regions. Each scissoring region may describe a specific section of the drawing surface to retain. The portions of the drawing that are clipped may be discarded and hence not rendered. Improved performance may be achieved by omitting computation for the discarded portions of the drawing.

Scissoring refers to a process of clipping a drawing or image with one or more scissoring regions. A GPU may perform scissoring in order to save computation for portions of the drawing that do not need to be rendered. However, processing and memory resources are consumed in order to perform scissoring. The amount of resources used for scissoring may increase with the number of scissoring regions.

There is therefore a need in the art for techniques to efficiently perform scissoring.

SUMMARY

Techniques for efficiently performing scissoring are described herein. In an aspect, scissoring for any number of scissoring regions may be performed in a sequential order by (a) drawing one scissoring region at a time onto a drawing surface or rendering area and (b) for each scissoring region, updating scissor values for pixels within the scissoring region.

The scissor values may be updated in various manners. In one design, a scissor value for a pixel indicates the number of scissoring regions covering that pixel. The scissor values for pixels within each scissoring region may be incremented by one if the scissoring region is being added or decremented by one if the scissoring region is being removed. In another design, a scissor value for a pixel is a bitmap for different scissoring regions, and each scissoring region is associated with a respective bit in the bitmap. For each scissoring region, the corresponding bit in the scissor values for the pixels within the scissoring region may be set to a predetermined value, e.g., one. In yet another design, a scissor value for a pixel indicates whether that pixel is within any scissoring region.

After updating the scissor values for all scissoring regions, pixels within a region of interest are passed for rendering. This may be achieved by comparing scissor values for pixels against a reference value and passing pixels with scissor values equal to or greater than the reference value. The reference value may be set to one for a scissoring UNION operation to pass pixels within a region formed by the union of all scissoring regions. The reference value may be set to larger than one for a scissoring AND operation to pass pixels within a region formed by the intersection of at least two (e.g., all) scissoring regions. Here, UNION and AND refer to logical operations on scissoring regions.

Various aspects and features of the disclosure are described in further detail below.

DETAILED DESCRIPTION

A graphics processing unit (GPU) that supports 2-D graphics may support scissoring with multiple scissoring regions. For example, a GPU may support "OpenVG Specification, Version 1.0," Jul. 28, 2005, which is publicly available and hereinafter referred to as OpenVG. OpenVG is a new standard for 2-D vector graphics and is suitable for handheld and mobile devices, e.g., cellular phones and gaming devices. OpenVG requires a 2-D GPU to support a minimum of 32 scissoring regions.

Figure 1:
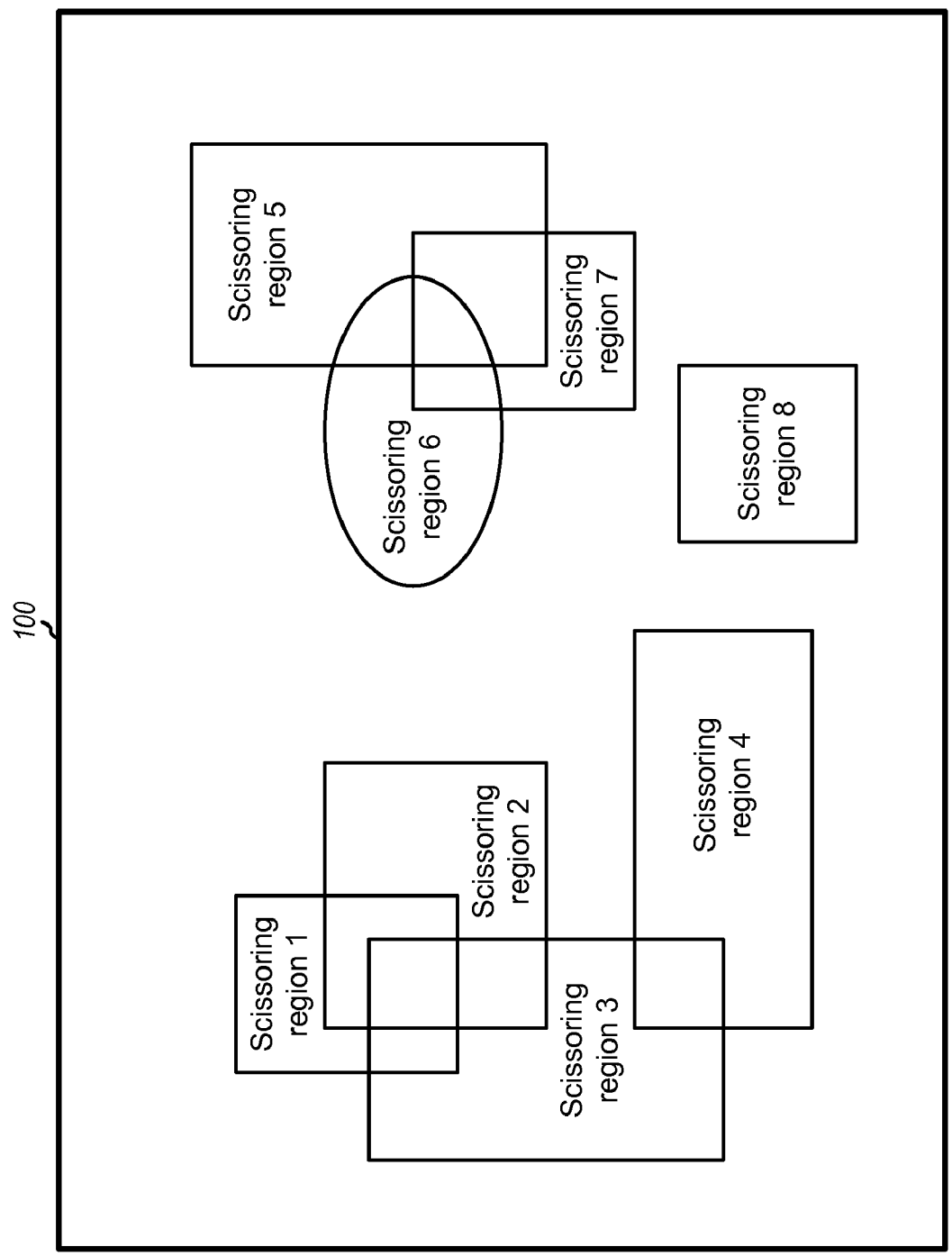
FIG. 1 illustrates scissoring regions in 2-D graphics.

FIG. 1 illustrates scissoring regions in 2-D graphics. A drawing surface 100 may represent a rendering area, a display screen, or for some other output device. Drawing surface 100 may have any width and height (W×H) dimension (e.g., 640 by 480 pixels for VGA) and may thus cover W H pixels. In the example shown in FIG. 1, eight scissoring regions are defined and are referred to as scissoring regions 1 through 8. Each scissoring region may be a rectangle that may be defined by two coordinates, e.g., one coordinate for the lower left corner and another coordinate for the upper right corner. In general, a scissoring region may have any shape, e.g., rectangle, triangle, circle, polygon, complex or arbitrary shape, etc. A scissoring region may also be of any size and may be located anywhere on the drawing surface. A scissoring region may also be referred to as a scissor region, a scissoring window, a scissoring rectangle, etc. For simplicity, much of the following description is for scissoring regions that are rectangles. As shown in FIG. 1, each scissoring region may overlap zero, one, or multiple other scissoring regions. For example, scissoring region 8 overlaps no other scissoring region, scissoring region 4 overlaps scissoring region 3, and scissoring region 3 overlaps scissoring regions 1, 2 and 4.

A GPU may perform scissoring by determining whether each of the W H pixels in drawing surface 100 falls within any one of the scissoring regions. Each pixel may be associated with a scissor value that may indicate whether that pixel is within any scissoring region. A scissor value may also be referred to as a mask value, etc. The GPU may use the scissor values to determine whether or not to render pixels. As an example, for a scissoring UNION operation, the GPU may render pixels that fall within a region defined by the union of all scissoring regions and may discard/drop pixels outside of this region.

A brute force implementation of 32 scissoring regions, as required by OpenVG, may utilize 32 registers to store the coordinates of these scissoring regions and 128 comparators to perform logic/compare operations. Four comparators may be used for each scissoring region to compare pixels against the four corners of the scissoring region to determine whether the pixels are within that scissoring region. The brute force implementation of many scissoring regions may be complex and costly for wireless communication devices, mobile devices, gaming devices, and other consumer electronics devices.

In an aspect, scissoring for any number of scissoring regions may be efficiently performed by (a) drawing one scissoring region at a time onto a drawing surface or rendering area and (b) updating the scissor values for pixels within each scissoring region. Scissoring may be performed by GPUs supporting 2-D graphics as well as GPUs supporting both 2-D and 3-D graphics. Scissoring may also be performed using processing and/or memory resources designed for other graphics functions, e.g., a stencil buffer and a stencil test unit commonly used for 3-D graphics.

Figure 2:
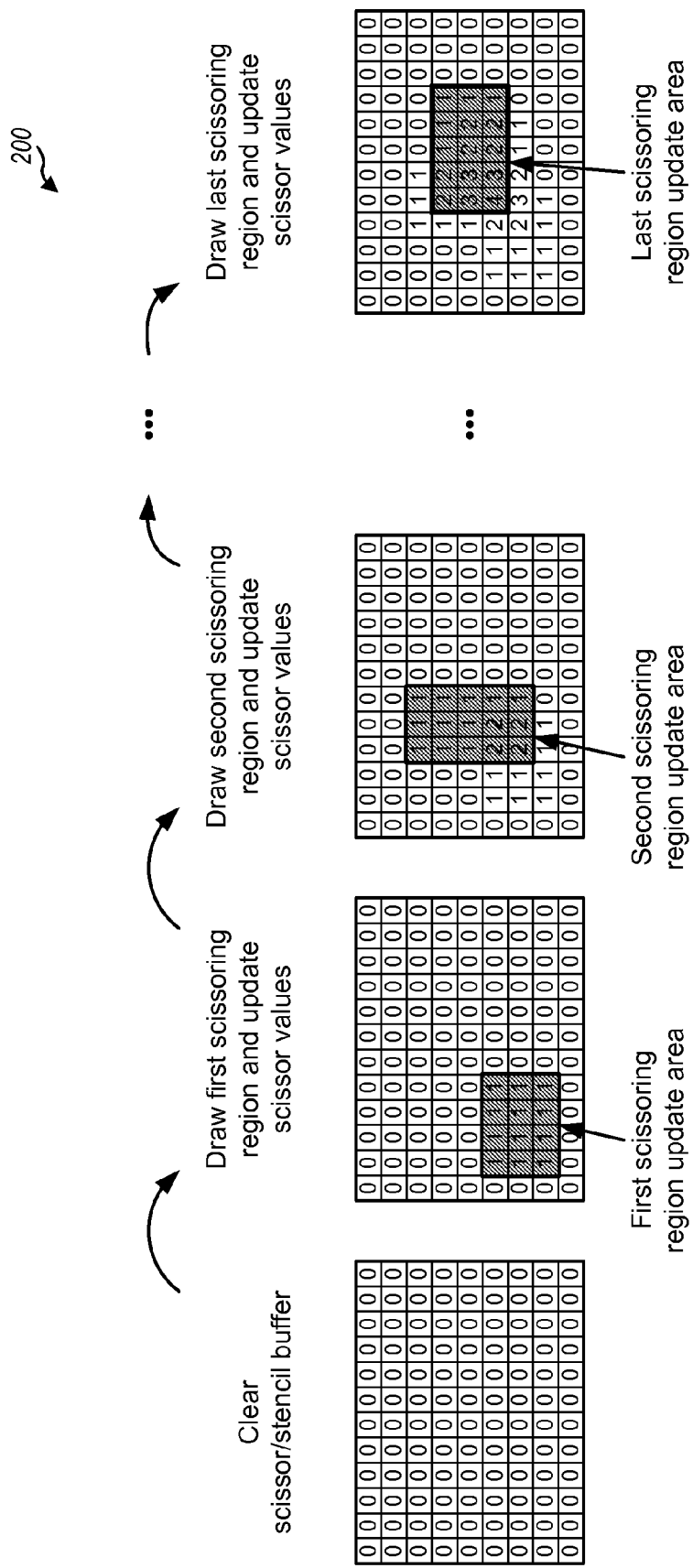
FIG. 2 illustrates scissoring with multiple scissoring regions.

FIG. 2 illustrates scissoring with multiple scissoring regions. A scissor buffer is used to store scissor values for pixels on a drawing surface. The scissor buffer may be a stencil buffer or some other buffer. The scissor buffer may have the same W×H dimension as the drawing surface and may store a scissor value for each pixel on the drawing surface. Other scissor buffer sizes may also be used. For simplicity, FIG. 2 shows a drawing surface with a dimension of 12×9.

A scissor value may be represented by N bits, where in general N may be one or greater. For example, N may be equal to 8, and an 8-bit scissor value may range from 0 to 255. Fewer or more bits may also be used for a scissor value depending on, e.g., the scissoring modes supported by the GPU.

The scissor buffer is initially cleared, e.g., by resetting all scissor values to zeros. The first scissoring region is then drawn, e.g., by reading the coordinates of the scissoring region and applying these coordinates to the drawing surface. The scissor value for each pixel within the first scissoring region may be updated in various manners, as described below. Scissoring may be achieved by scanning the pixel positions within the scissoring region and, for each scanned pixel position, updating the corresponding scissor value in the scissor buffer. In this way, only scissor values for pixels within the scissoring region are updated, and other pixels outside of the scissoring region are not affected.

The second scissoring region is then drawn, e.g., in similar manner as the first scissoring region. The scissor value for each pixel within the second scissoring region may be updated as described below. Each additional scissoring region may be drawn in similar manner, and the scissor values for pixels within the scissoring region may be updated. After the last scissoring region has been drawn and the updating of the scissor values is completed, the scissor values in the scissor buffer are available for use to determine whether or not to render pixels.

In a first design, a scissor value for a pixel indicates the number of scissoring regions covering that pixel. In this design, as each scissoring region is drawn, the scissor value for each pixel covered by that scissoring region is incremented by one. After all of the scissoring regions has been drawn, the scissor value for each pixel will be greater than zero if that pixel is covered by at least one scissoring region. A scissor value of k for a given pixel indicates that the pixel is covered by k scissoring regions, where $0 \leq k \leq K$ and K is the number of scissoring regions. If N bits are used for each scissor value, then up to $2^N-1$ scissoring regions are supported. For example, 8-bit scissor values support up to 255 scissoring regions.

In a second design, a scissor value for a pixel indicates specific scissoring regions, if any, covering that pixel. In this design, the N-bit scissor value for each pixel is a bitmap. Each bit position in the bitmap corresponds to one scissoring region. For example, the least significant bit (LSB) of the scissor value may correspond to the first scissoring region, the next LSB may correspond to the second scissoring region, and so on, and the most significant bit (MSB) may correspond to the N-th scissoring region. As the k-th scissoring region is drawn, for $k \in \{1, \ldots, K\}$, the k-th bit of the scissor value for each pixel covered by that scissoring region may be set to one. After all of the scissoring regions has been drawn, the scissor value for each pixel will be greater than zero if that pixel is covered by at least one scissoring region. The bits of the scissor value may be examined to determine the specific scissoring regions, if any, covering the pixel. If N bits are used for each scissor value, then up to N scissoring regions are supported.

The second design can also support more than N scissoring regions with N-bit scissor values. If an 8-bit stencil value is used, then eight scissoring regions may be mapped to eight bits, one scissoring region per bit as described above. To support more than eight scissoring regions, each bit of the stencil value may be used to represent more than one scissoring region. For example, the 8-bit stencil value may be overlapped as follows: use bit 0 for regions 0, 8, 16, etc., use bit 1 for regions 1, 9, 17, etc., and so on, and use bit 7 for regions 7, 15, 23, etc. Bit n corresponding to a given scissoring region k may be determined by a modulo-8 operation, or n=k mod 8=k % 8, which provides the remainder of scissoring region k divided by 8. In the second design, each bit may also represent the UNION of a set of scissoring regions and may be used to indicate whether a pixel is within any of the scissoring regions in the set. The bits of the scissor value for a pixel may also be associated with non-overlapping sets of scissoring regions, such that each scissoring region belongs to only one of the sets. The aggregation of all of the bits would then represent all scissoring regions. This may be used to increase the number of scissoring regions that can be supported.

In a third design, a scissor value for a pixel indicates whether that pixel is covered by any scissoring region. In this design, a 1-bit scissor value may be used for each pixel. As each scissoring region is drawn, the 1-bit scissor value for each pixel covered by that scissoring region may be set to one. After all of the scissoring regions has been drawn, the scissor value for each pixel will be equal to one if that pixel is covered by at least one scissoring region. This design reduces buffer requirements for the scissor values.

The scissor values may also be updated in other manners and with other designs. Different designs may have different update capabilities. For example, the first and second designs support efficient updating of the scissor values whenever existing scissoring regions are removed or new scissoring regions are added.

For the first design, an existing scissoring region may be removed by re-drawing the scissoring region and decrementing by one and saturating at zero the scissor value for each pixel within the scissoring region. A new scissoring region may be added by drawing the scissoring region and incrementing by one the scissor value for each pixel within the scissoring region. Thus, whenever scissoring regions are added or removed, only new scissoring regions to be added are drawn, only scissoring regions to be removed are redrawn, and other scissoring regions to be retained are not affected, which may save computation.

For the second design, an existing scissoring region may be removed by re-drawing the scissoring region and resetting to zero the corresponding scissor bit value for each pixel within that scissoring region. A new scissoring region may be added by drawing the scissoring region and setting to one the corresponding scissor bit value for each pixel within that scissoring region.

Different designs may also support different scissoring modes. All three designs described above support scissoring UNION operation. For scissoring UNION, a pixel is within a region formed by the union of all scissoring regions (or within at least one scissoring region) if its scissor value is one or greater. The first and second designs also support scissoring AND operation. For scissoring AND, a pixel is within a region formed by the intersection of at least two (R) scissoring regions if its scissor value is greater than one. In general, R may be set to any value greater than one and up to the number of scissoring regions. If R is equal to the number of scissoring regions, then only pixels within all scissoring regions are passed.

For the first design, scissoring AND may be achieved by comparing the scissor value for a pixel against a reference value, passing the pixel if the scissor value is equal to or greater than the reference value, and discarding the pixel otherwise. For the second design, scissoring AND may be achieved by examining the bits that are set in the scissor value for a pixel, comparing the set bits against the reference value, and either passing or dropping the pixel based on the comparison result.

The second design also supports selective UNION operation, selective AND operation, etc. For selective AND, pixels within a region formed by the intersection of selected ones of the K scissoring regions are passed. For selective UNION, pixels within a region formed by the union of selected ones of the K scissoring regions are passed. For all of the designs, the reference value for a pixel may be a mask used in a bitwise logical test with the scissor value for that pixel. For example, in the second design, an AND operation may be performed against the mask and the scissor value for the pixel. Scissoring may then be able to discriminate specific regions based on the pixels being drawn.

The second design may be used for various purposes such as, e.g., to draw multiple images on a drawing surface. Different sections of the drawing surface may be drawn with different images and may be defined by different scissoring regions. The scissoring regions and bitmap may be used to determine which image to draw in each drawing section. For example, an image may be drawn in a section defined by the k-th scissoring region, and pixels within this section may be determined by examining the k-th bit of the corresponding scissor values. The second design may also be used to mask icon rendering, to mask rendering to visible pixels of a drawable surface in a windowed system, to support non-rectangular clipping in support of complex window shapes, etc.

Figure 3:
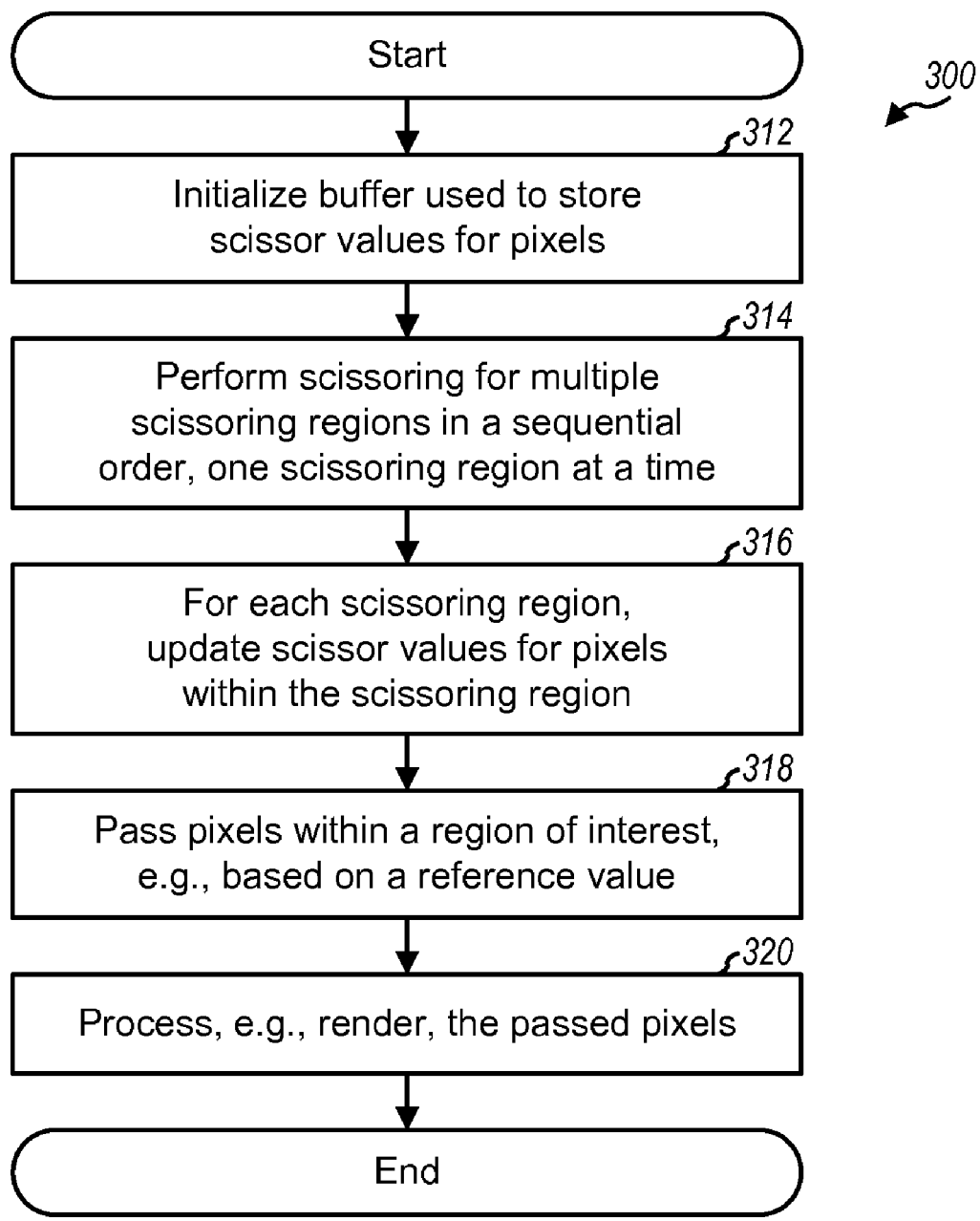
FIG. 3 shows a process for performing scissoring.

FIG. 3 shows a process 300 for performing scissoring with multiple scissoring regions. Initially, a buffer used to store scissor values for pixels is initialized, e.g., by resetting the scissor values in the buffer to zeros (block 312). Scissoring is then performed for multiple scissoring regions in a sequential order, one scissoring region at a time (block 314). For each scissoring region, scissor values for pixels within the scissoring region are updated (block 316).

The updating in block 316 may be performed in various manners. For the first design, a scissor value for a pixel may indicate the number of scissoring regions covering that pixel. The scissor values for pixels within each scissoring region may be incremented by one. For the second design, a scissor value for a pixel may be a bitmap for different scissoring regions, and each scissoring region may be associated with a respective bit in the bitmap. For each scissoring region, the corresponding bit of the scissor values for pixels within the scissoring region may be set to a predetermined value, e.g., one. For the third design, a scissor value for a pixel may indicate whether that pixel is within any scissoring region. The scissor values for pixels within each scissoring region may be set to a predetermined value, e.g., one. The updating may include utilizing polygon transformation and rasterization processing units to draw simple or complex shapes to the scissor buffer.

Scissoring may be performed to remove one or more of the multiple scissoring regions. For each scissoring region to be removed, the scissor values for pixels within the scissoring region may be updated, e.g., decremented by one if the scissor values are greater than zero. Scissoring may also be performed to add one or more scissoring regions to the multiple scissoring regions. For each scissoring region to be added, the scissor values for pixels within the scissoring region may be updated, e.g., incremented by one.

After updating the scissor values for all scissoring regions, pixels generated by rendering code and within a region of interest are passed (block 318). This may be achieved by comparing scissor values for pixels against a reference value and passing pixels with scissor values equal to or exceeding the reference value. A reference value of one may be used for all three designs for scissoring UNION operation to pass pixels within a region formed by the union of the multiple scissoring regions. A reference value of larger than one may be used for the first design for scissoring AND operation to pass pixels within a region formed by the intersection of at least two (e.g., all) of the multiple scissoring regions. For the second design, individual bits of the scissor values may be examined to pass pixels in the region of interest. In any case, the passed pixels are further processed, e.g., rendered (block 320).

A GPU may support 2-D and/or 3-D graphics. 2-D graphics store 2-D representation of geometric data used to generate 2-D images. 3-D graphics store 3-D representation of geometric data that are processed to generate 2-D images. 2-D graphics may be compared to painting whereas 3-D graphics may be compared to sculpting. 2-D and 3-D graphics may utilize different pipelines with different graphics operations to generate output images.

Figure 4:
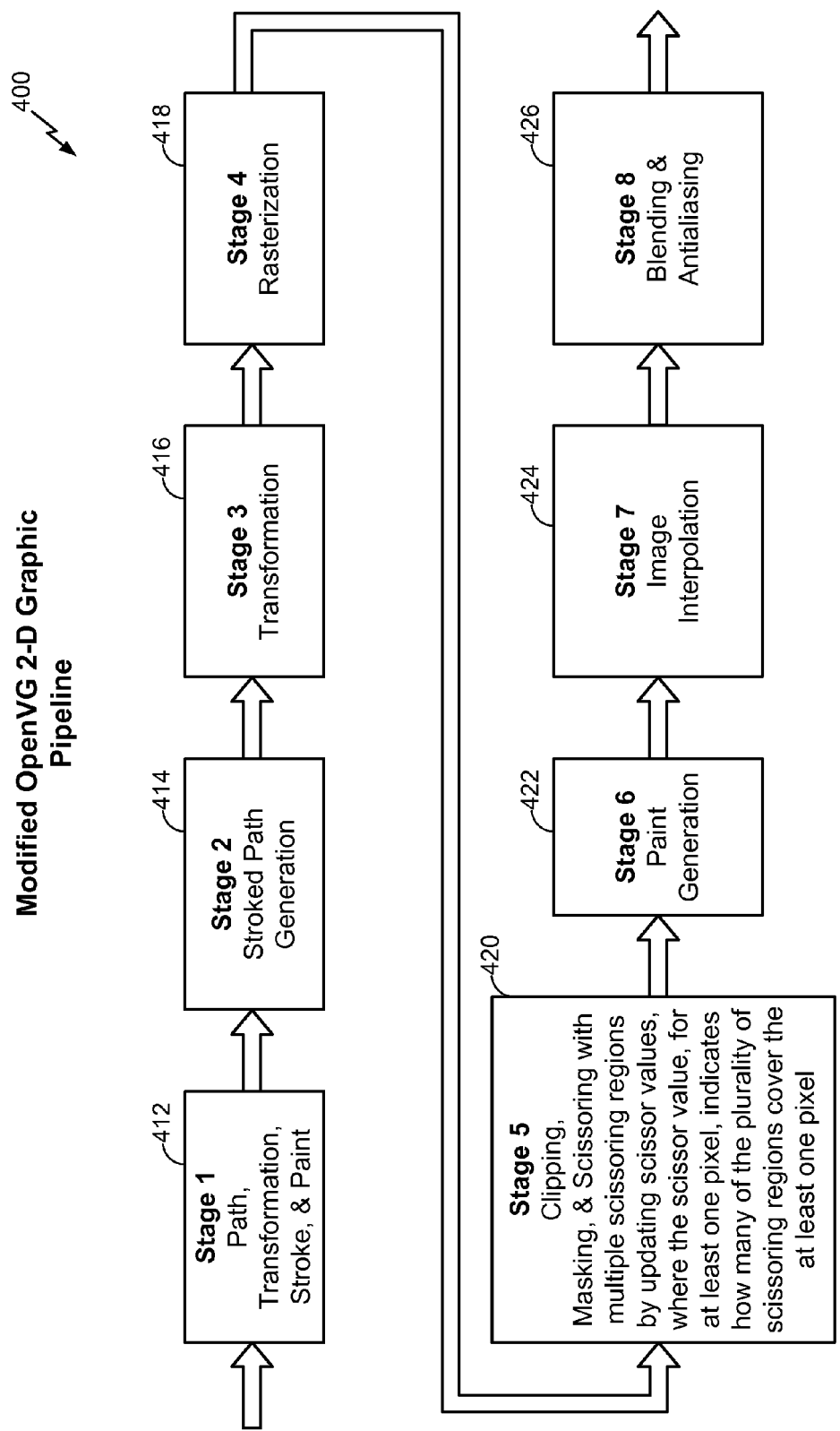
FIG. 4 shows a 2-D graphics pipeline.

FIG. 4 shows a block diagram of a 2-D graphics pipeline 400 described in OpenVG. A drawing in 2-D graphics is composed of paths. Each path defines the duration of a pen or paint brush over a drawing surface. Paths are used to define geometry in the drawing. A path may be stroked and/or filled. Stroke refers to defining outlines of path shapes with lines. Fill refers to applying color, gradient, or texture to a shape's interior.

In block 412 for stage 1, an application defines a path to be drawn and sets transformation, stroke, and paint parameters, if any, to be used by subsequent stages. In block 414 for stage 2, the path is transformed from a user coordinate system to a surface coordinate system. If the path is to be stroked, then the stroked parameters are applied in the user coordinate system to generate a new path that describes the stroked geometry in the surface coordinate system. This new path is referred to as the current path and is operated on by subsequent stages in the pipeline. In block 416 for stage 3, path-to-surface transformation is applied to the geometry of the current path to generate drawing surface coordinates. In block 418 for stage 4, a coverage value is computed for each pixel affected by the current path. Stage 4 maps the current path to pixels on the drawing surface.

In block 420 for stage 5, pixels that are not within the bounds of the drawing surface and, if scissoring is enabled, not within one or more scissoring regions are assigned coverage values of zero. The remaining processing is skipped for pixels with coverage values of zero. Stage 5 may perform scissoring with multiple scissoring regions, as described above.

In block 422 for stage 6, a color value and an alpha value are defined for each pixel on the drawing surface based on the current relevant paint, which may depend on whether the path is being filled or stroked. Stage 6 applies a paint image to pixels on the current path. In block 424 for stage 7, if an image is being drawn, then an image color value and an alpha value are computed for each pixel by interpolating image values using the inverse of an image-to-surface transformation. The results are combined with the paint color and alpha values in accordance with the current image drawing mode. In block 426 for stage 8, the source color and alpha values for each pixel from stage 7 are converted to destination color space and blended with the corresponding destination color and alpha values in accordance with a selected blending mode.

2-D graphics may also be supported with other pipelines that may render primitives in other manners. Primitives are basic units of geometry and may be lines, segments, points, etc. Scissoring with multiple scissoring regions may be performed by a clipping/masking stage in a 2-D graphics pipeline.

Figure 5:
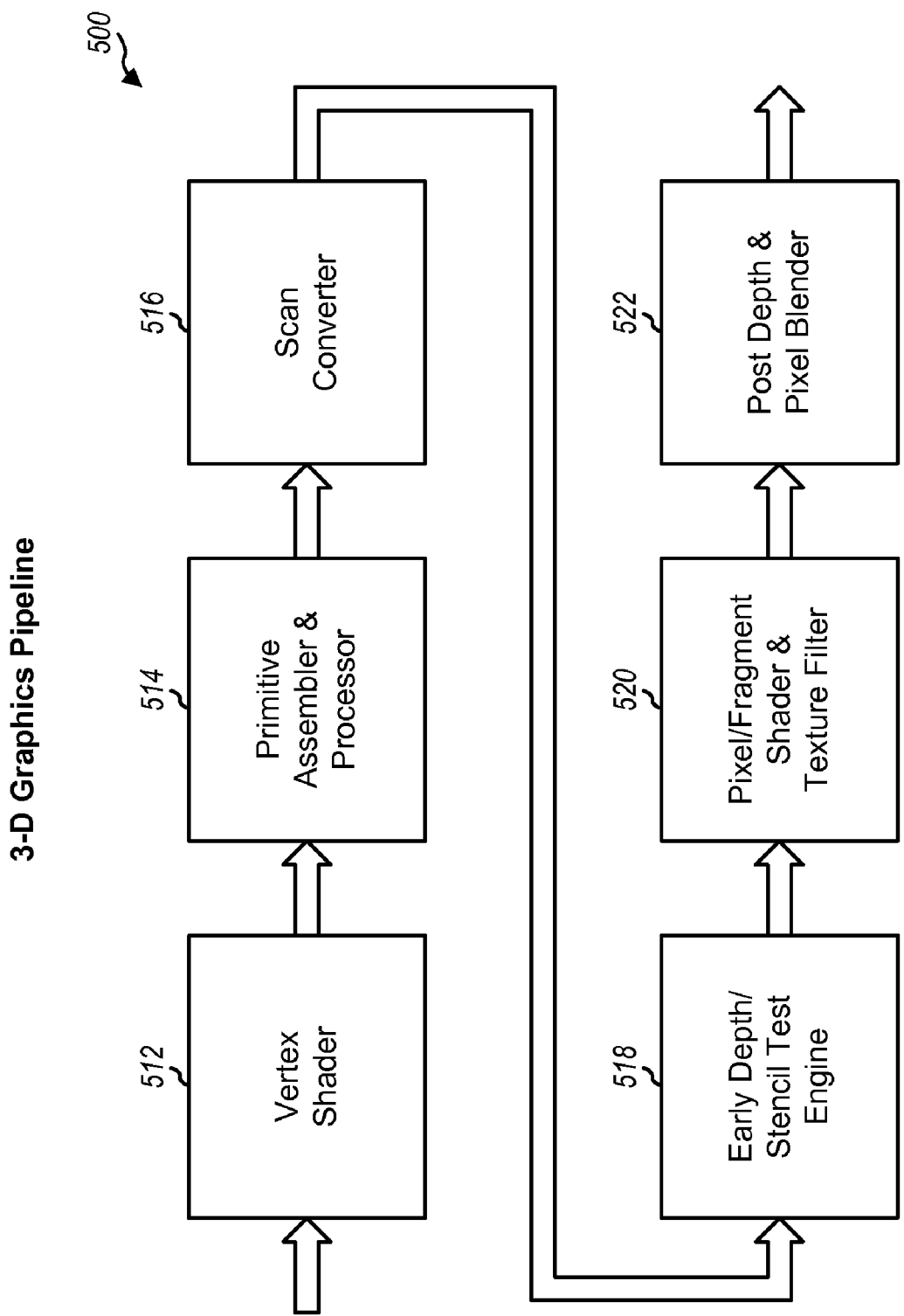
FIG. 5 shows a 3-D graphics pipeline.

FIG. 5 shows a block diagram of a 3-D graphics pipeline 500 that supports 3-D graphics and may also support 2-D graphics. Pipeline 500 may support a 3-D software interface such as Open Graphics Library (OpenGL), Direct3D, etc. OpenGL is described in a document entitled "The OpenGL® Graphics System: A Specification," Version 2.0, dated Oct. 22, 2004, which is publicly available.

A 2-D or 3-D image may be represented with polygons (typically triangles). Each triangle is defined by three vertices, and each vertex is associated with various attributes such as space coordinates, color values, texture coordinates, etc. Each attribute may have up to four components. For example, space coordinates may be given by either three components x, y and z or four components x, y, z and w, where x and y are horizontal and vertical coordinates, z is depth, and w is a homogeneous coordinate. Color values may be given by three components r, g and b or four components r, g, b and a, where r is red, g is green, b is blue, and a is a transparency factor that determines the transparency of a pixel. Texture coordinates are typically given by horizontal and vertical coordinates, u and v. A vertex may also be associated with other attributes. Pipeline 500 renders the 2-D or 3-D image by computing attribute component values for pixels to be displayed.

A vertex shader 512 may perform various graphics operations on geometry, e.g., triangles. For example, vertex shader 512 may transform geometry from one coordinate system to another coordinate system, calculate light values for vertices of geometry, perform blending for geometry, etc. A primitive assembler and processor 514 computes parameters for the subsequent rasterization process. For example, processor 514 may compute coefficients of linear equations for three edges of each triangle, depth (z) gradient for depth interpolation for pixels, etc. A scan converter 516 decomposes each triangle or line into pixels and generates a screen coordinate for each pixel.

An early depth/stencil test engine 518 performs depth and/or stencil test for pixels, if enabled, to determine whether the pixels should be rendered or discarded. The terms "engine", "core", "machine", "processor" and "processing unit" are often used interchangeably. A stencil buffer (not shown in FIG. 5) stores the current stencil value for each pixel location in the image being rendered. For stencil test, engine 518 compares the stored stencil value for a pixel against a reference value and passes or discards the pixel based on the outcome of the comparison. Engine 518 may perform a depth test (which is also called a z-test) on pixels, if applicable, to determine whether the pixels should be rendered or discarded. A z-buffer (also not shown in FIG. 5) stores the current z value for each pixel location in the image being rendered. For depth test, engine 518 compares the z value for a pixel (the current z value) against the corresponding z value in the z-buffer (the stored z value), passes the pixel and updates the z-buffer and possibly the stencil buffer if the current z value is closer/nearer than the stored z value, and discards the pixel if the current z value is further back than the stored z value.

A pixel/fragment shader and texture filter 520 may perform various graphics operations on pixels and fragments. A fragment is a pixel and its associated information. Shader 520 may compute parameters for interpolation of pixel attributes, e.g., coefficients of linear equations for attribute interpolation. Shader 520 may then compute attribute component values for each pixel within each triangle based on the pixel's screen coordinate and using the interpolation parameters. Texture filter 520 performs texture mapping, if enabled, to apply texture to each triangle. A texture image may be stored in a texture buffer (not shown in FIG. 5). The three vertices of each triangle may be associated with three (u, v) coordinates in the texture image, and each pixel of the triangle may then be associated with specific texture coordinates in the texture image. Texturing is achieved by modifying the color of each pixel with the color of the texture image at the location indicated by that pixel's texture coordinates.

A post depth and pixel blender 522 may perform graphics operations such as alpha test, fog blending, alpha blending, logic operation, and dithering operation on each fragment and provides results to a color buffer.

The stages in 3-D graphics pipeline 500 are generally designed for 3-D graphics. These stages may also be used to support 2-D graphics. In one design, stages 1 and 2 of 2-D graphics pipeline 400 in FIG. 4 are performed in software or a pre-processing unit, stage 3 is performed by vertex shader 512, stage 4 is performed by primitive assembler and processor 514, stage 5 is performed by early depth/stencil test engine 518, stages 6 and 7 are performed by pixel/fragment shader and texture filter 520, and stage 8 is performed by post depth and pixel blender 522. Pipeline 500 may also supported 2-D graphics in other manners, e.g., with different mappings of the stages in pipeline 400 to the units in pipeline 500. Pipeline 500 may include extensions and/or modifications to support 2-D graphics operations.

A GPU may support just 2-D graphics, e.g., by implementing pipeline 400 in FIG. 4 or some other 2-D graphics pipeline. A GPU may also support both 2-D and 3-D graphics, e.g., by implementing pipeline 500 in FIG. 5 or some other graphics pipeline.

For a GPU that supports both 2-D and 3-D graphics, a stencil unit (e.g., a stencil buffer and stencil test engine) may be used to perform scissoring for 2-D graphics. The stencil unit typically has high throughput (e.g., two to four times faster than color operation throughput) and is normally associated with a high efficient stencil cache that can save data bus bandwidth. The stencil unit may perform stencil test early when rendering 3-D graphics so that computationally intensive operations may be avoided if the stencil test fails. The stencil unit may be used to perform scissoring for 2-D graphics to accelerate pixel rendering.

The stencil unit typically performs a stencil test and a stencil operation for each incoming pixel. The stencil test determines whether to pass or drop the pixel based on the current stencil value stored in the stencil buffer for the pixel. The stencil operation may update the stencil value according to stencil operation codes based on the result of the depth and/or stencil test.

The stencil unit may perform scissoring as follows. First, the stencil buffer is clear to zero, e.g., using a fast clear. The stencil buffer normally stores stencil values for 3-D graphics and is used to store scissor values for 2-D graphics. A render buffer area over which to apply scissoring regions is defined. For the first design described above, the stencil unit may be set as follows:

1. Stencil test function=ALWAYS,
2. Stencil operation=INCREASE_WRAP or INCREASE, and
3. Enable stencil write to stencil buffer.

The first setting causes the stencil unit to always pass stencil test on pixels, which would allow for updating of the scissor values for these pixels. The second setting indicates how the stencil values are updated. The stencil values may be (a) incremented and saturated with the INCREASE setting or (b) incremented and wrapped around after reaching the maximum value with the INCREASE_WRAP setting. The stencil operation may also be set to DECREASE_WRAP or DECREASE when removing scissoring regions. For the second design described above, the stencil operation may be set to REPLACE with a reference stencil value of {1<<(Scissor#%8)}, where "%8" denotes a modulo-8 operation. The third setting enables update of the scissor values in the stencil buffer after drawing each scissoring region.

The stencil unit may then perform scissoring by drawing one scissoring region at a time and updating the scissor values in the stencil buffer as indicated by the stencil operation. After drawing all scissoring regions, the GPU may render 2-D (e.g., OpenVG) primitives (e.g., path, mask, paint, image, etc.) using the available processing and memory resources. For example, the stages in 2-D graphics pipeline 400 in FIG. 4 may be mapped to the blocks in 3-D graphics pipeline 500 in FIG. 5 as described above.

During the rendering process, stencil test may be performed on pixels by reading the scissor values from the stencil buffer and comparing the scissor values against a reference stencil value. For scissoring UNION operation, the stencil test function may be set to LARGER THAN, and the reference stencil value may be set to zero. For scissoring AND operation, the stencil test function may be set to EQUAL TO, and the reference stencil value may be set to a value larger than one. The reference stencil value may be set to R to pass pixels covered by at least R scissoring regions. Only one compare may be performed for each pixel regardless of the number of scissoring regions being applied, which may greatly speed up the rendering process. Pixels that pass the stencil test are within the region of interest and may be forwarded to the subsequent stage in the pipeline. Pixels that fail the stencil test may be dropped.

Figure 6:
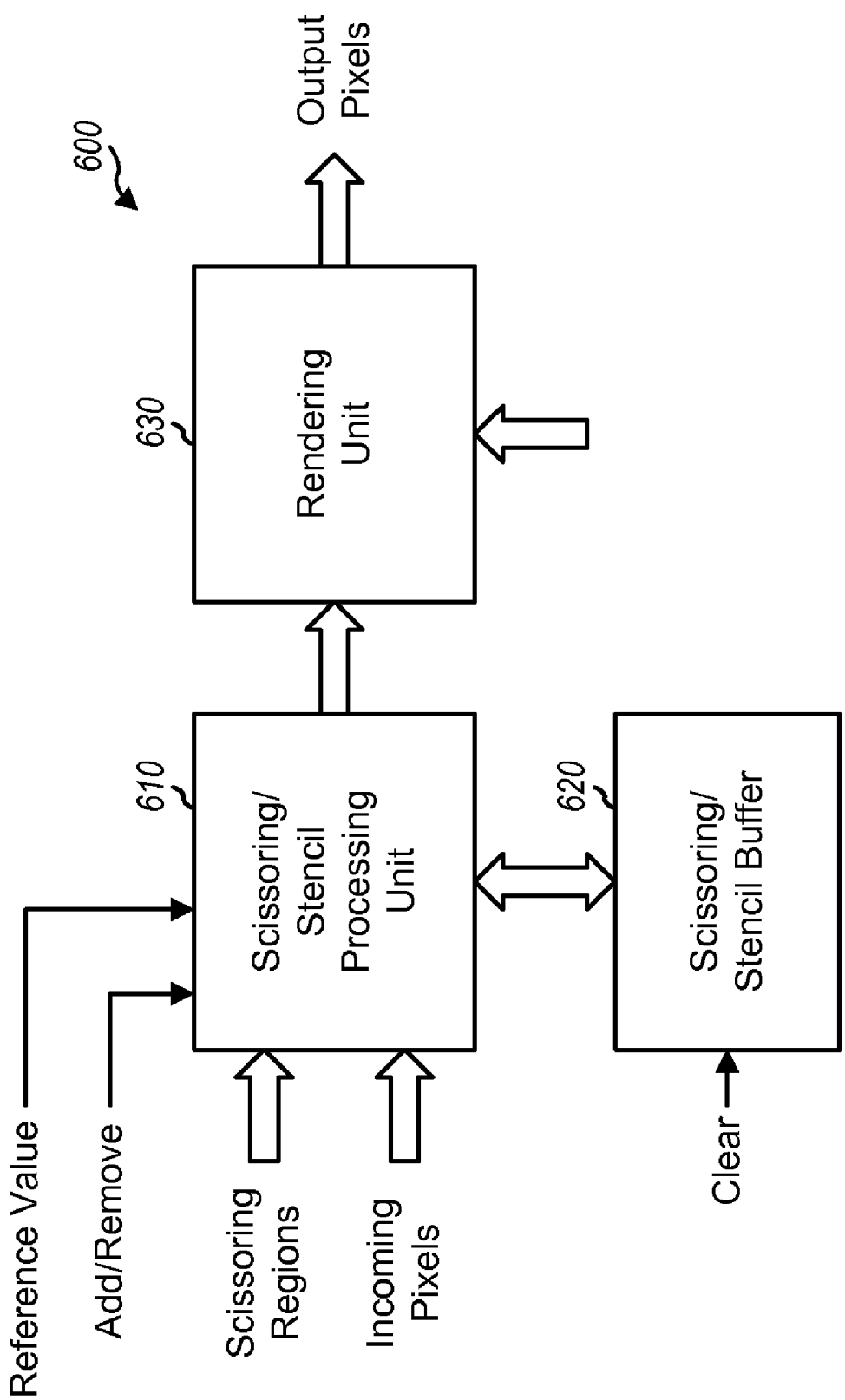
FIG. 6 shows a GPU that performs scissoring.

FIG. 6 shows a block diagram of a GPU 600 that performs scissoring. GPU 600 may implement stage 5 in 2-D graphics pipeline 400 in FIG. 4 and/or early depth/stencil test engine 518 in 3-D graphics pipeline 500 in FIG. 5. GPU 600 may include other processing and control units, engines, and memories, which are not shown in FIG. 6 for simplicity.

A processing unit 610 receives scissoring regions and updates scissor values for pixels covered by these scissoring regions, as described above. The updating is dependent on whether scissoring regions are added or removed. A buffer 620 stores scissor values for pixels. Processing unit 610 may also perform scissor/stencil test based on a reference value to pass pixels in a region of interest. Processing unit 610 may receive (x, y) coordinates for incoming pixels, e.g., from stage 4 in FIG. 4, determine the scissor values for these pixels based on their coordinates, and determine whether each pixel should be passed or dropped based on its scissor value and the reference value. The reference value may be set based on the desired scissoring operation, e.g., UNION or AND. A rendering unit 630 renders pixels that passed the scissor/stencil test and may perform any suitable graphics operation to render these pixels. Processing unit 610 may perform the processing shown in blocks 312 through 318 in FIG. 3. Rendering unit 630 may perform the processing shown in block 320 in FIG. 3.

In one design, scissoring and rendering are performed in multiple passes. In the first pass, scissoring regions are drawn onto the scissor buffer, scissor values are updated, and no pixels are passed to rendering unit 630. In the second pass, unit 610 processes incoming pixels to determine whether to pass or reject each pixel based on its scissor value and forwards the passed pixels to rendering unit 620. Scissoring and rendering may also be performed in other manners for other designs.

Processing unit 610 may be a stencil test engine and buffer 620 may be a stencil buffer for 3-D graphics. The stencil buffer and stencil test engine may be used to efficiently perform scissoring for 2-D graphics. Processing unit 610 may perform stencil test (e.g., with a setting of ALWAYS) and stencil operation (e.g., with a setting of INCREASE, INCREASE_WRAP, DECREASE, or DECREASE_WRAP) for each scissoring region to update the scissor values for pixels within the scissoring region.

An image may be scaled larger, e.g., when super sampling antialiasing is turned on. In this case, a scissor value may represent a portion of a pixel (or subpixel). For example, if an image is scaled two times larger, then there may be four scissor values for each pixel, with each scissor value corresponding to one of four subpixels. Scissoring may be performed in the manner described above, albeit for subpixels instead of pixels.

As noted above, a scissoring region may have any shape and any size. Scissoring for a scissoring region of an arbitrary shape may be achieved by first tessellating the scissoring region into a triangle fan, which is a polygon with any number of sides and shape. The triangle fan may be decomposed into triangles. Each triangle may be rasterized to determine pixels within that triangle. The scissor value for each pixel within each triangle may be updated based on any of the designs described above.

The scissoring techniques described herein may be used for wireless communication devices, handheld devices, gaming devices, computing devices, consumer electronics devices, etc. An exemplary use of the techniques for a wireless communication device is described below.

Figure 7:
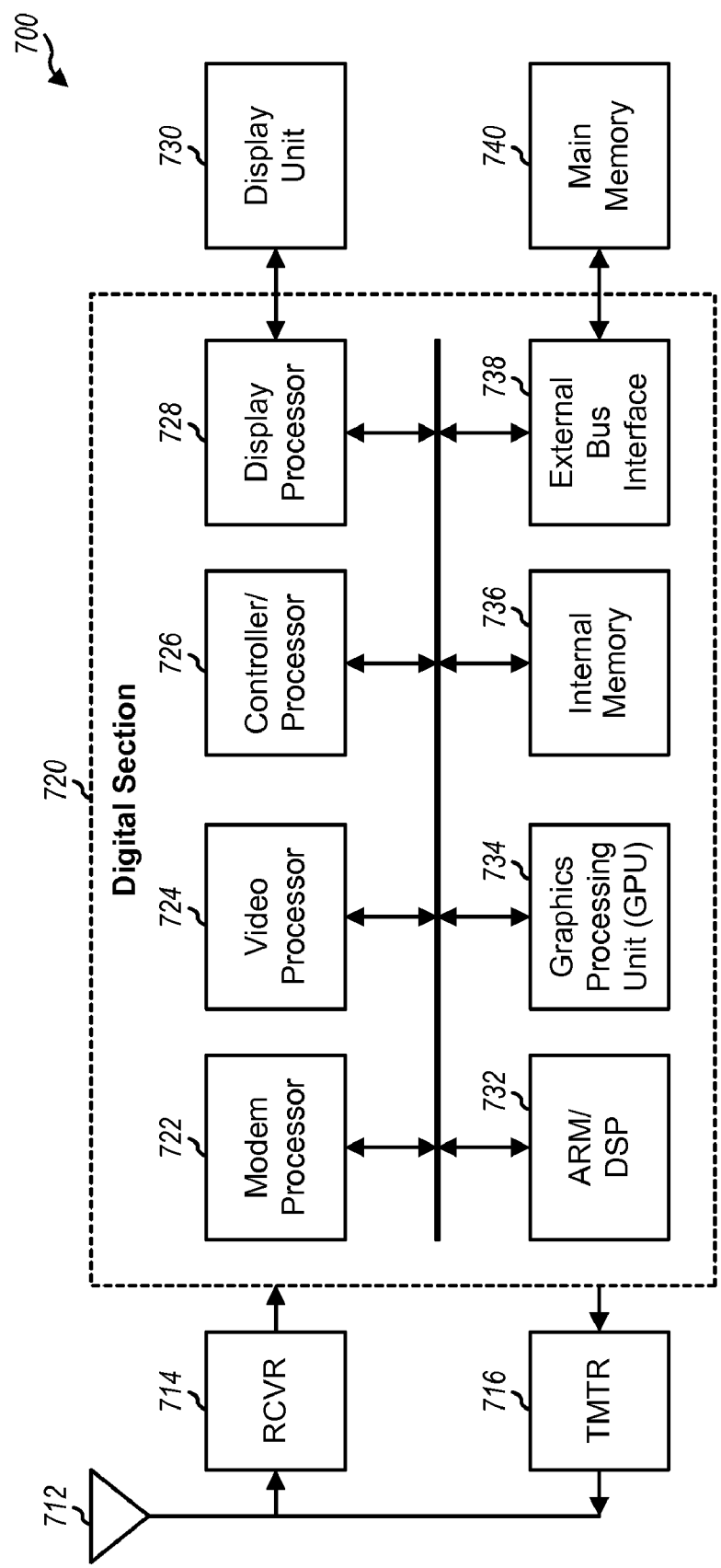
FIG. 7 shows a block diagram of a wireless communication device.

FIG. 7 shows a block diagram of a design of a wireless communication device 700 in a wireless communication system. Wireless device 700 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 700 is capable of providing bi-directional communication via a receive path and a transmit path. On the receive path, signals transmitted by base stations are received by an antenna 712 and provided to a receiver (RCVR) 714.

Receiver 714 conditions and digitizes the received signal and provides samples to a digital section 720 for further processing. On the transmit path, a transmitter (TMTR) 716 receives data to be transmitted from digital section 720, processes and conditions the data, and generates a modulated signal, which is transmitted via antenna 712 to the base stations.

Digital section 720 includes various processing, interface and memory units such as, for example, a modem processor 722, a video processor 724, a controller/processor 726, a display processor 728, an advance RSIC machine/digital signal processor (ARM/DSP) 732, a GPU 734, an internal memory 736, and an external bus interface (EBI) 738. Modem processor 722 performs processing for data transmission and reception (e.g., encoding, modulation, demodulation, and decoding). Video processor 724 performs processing on video content (e.g., still images, moving videos, and moving texts) for video applications such as camcorder, video playback, and video conferencing. Controller/processor 726 may direct the operation of various processing and interface units within digital section 720. Display processor 728 performs processing to facilitate the display of videos, graphics, and texts on a display unit 730. ARM/DSP 732 may perform various types of processing for wireless device 700. GPU 734 performs graphics processing and may implemented process 300 in FIG. 3, all or part of 2-D graphics pipeline 400 in FIG. 4, all or part of 3-D graphics pipeline 500 in FIG. 5, some other graphics pipeline, GPU 600 in FIG. 6, etc. Internal memory 736 stores data and/or instructions for various units within digital section 720. EBI 738 facilitates transfer of data between digital section 720 (e.g., internal memory 736) and a main memory 740.

Digital section 720 may be implemented with one or more DSPs, micro-processors, RISCs, etc. Digital section 720 may also be fabricated on one or more application specific integrated circuits (ASICs) and/or some other type of integrated circuits (ICs).

The scissoring techniques described herein may be implemented by various means. For example, these techniques may be implemented in hardware, firmware, software, or a combination thereof. For a hardware implementation, the processing unit(s) used to perform scissoring (e.g., GPU 600 in FIG. 6, GPU 734 in FIG. 7, etc.) may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing unit(s) may or may not include integrated/embedded memory.

An apparatus implementing the scissoring techniques described herein may be a stand-alone unit or part of a device. The device may be (i) a stand-alone IC such as a graphics IC, (ii) a set of one or more ICs that may include memory ICs for storing data and/or instructions, (iii) an ASIC, such as a mobile station modem (MSM), with integrated graphics processing functions, (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A device comprising:
a buffer to store scissor values for pixels; and
a processing unit to perform scissoring for multiple scissoring regions in a sequential order, one scissoring region at a time and, for each one of the scissoring regions, to update the scissor values for pixels within each one of the scissoring regions, wherein at least one of the pixels is covered by a plurality of the scissoring regions, wherein the scissor value, for the at least one pixel, indicates how many of the plurality of scissoring regions cover the at least one pixel, and wherein the processing unit is implemented at least partially by one or more hardware components.

2. The device of claim 1, wherein for each scissoring region the processing unit increments the scissor values for the pixels within the scissoring region.

3. The device of claim 2, wherein the processing unit removes one or more of the multiple scissoring regions and, for each one of the one or more scissoring regions that is removed, decrements scissor values for the pixels that are within the one or more removed scissoring regions if the scissor values are greater than zero.

4. The device of claim 2, wherein the processing unit performs scissoring for one or more scissoring regions added to the multiple scissoring regions and, for each one of the one or more scissoring regions that are added, increments scissor values for pixels that are within the one or more added scissoring regions.

5. The device of claim 1, wherein the buffer is initialized prior to performing scissoring by resetting the scissor values in the buffer to zeros.

6. The device of claim 1, wherein the processing unit compares the scissor values for the pixels against a reference value and passes the pixels with scissor values equal to or exceeding the reference value.

7. The device of claim 1, wherein the processing unit receives incoming pixels from a prior stage in a graphics pipeline and determines whether to pass or drop each of the incoming pixels based on the scissor values for the incoming pixels.

8. The device of claim 1, wherein the processing unit passes pixels within a region formed by union of the multiple scissoring regions.

9. The device of claim 1, wherein the processing unit passes pixels within a region formed by intersection of at least two of the multiple scissoring regions.

10. The device of claim 1, wherein the processing unit passes pixels within a region formed by intersection of the multiple scissoring regions.

11. The device of claim 1, further comprising:
a rendering unit to render pixels within a region of interest based on the scissor values in the buffer.

12. The device of claim 1, wherein the buffer is a stencil buffer and the processing unit is a stencil test unit for 3-D graphics, and wherein the stencil buffer and stencil test unit are used to perform scissoring for 2-D graphics.

13. The device of claim 12, wherein for each one of the scissoring regions, the processing unit performs stencil tests for the pixels within the each one of the scissoring regions and performs stencil operations to update the scissor values for the pixels within the each one of the scissoring regions.

14. The device of claim 1, wherein each one of the pixels is associated with an N-bit scissor value, where N is greater than one, and wherein the processing unit performs scissoring for up to $2^N-1$ scissoring regions.

15. A device comprising:
a stencil buffer to store stencil values for pixels in 3-D graphics and to store scissor values for pixels in 2-D graphics; and
a stencil test unit to perform stencil test for 3-D graphics, to perform scissoring for multiple scissoring regions in a sequential order for 2-D graphics, and to update the scissor values for pixels within each one of the scissoring regions, wherein at least one of the pixels is covered by a plurality of the scissoring regions, wherein the scissor value, for the at least one pixel, indicates how many of the plurality of scissoring regions cover the at least one pixel, and wherein the stencil test unit is implemented at least partially by one or more hardware components.

16. The device of claim 15, wherein for each one of the scissoring regions, the stencil test unit increments the scissor values for the pixels within each one of the scissoring regions.

17. A wireless device comprising:
a processor to perform scissoring for multiple scissoring regions in a sequential order, one scissoring region at a time and, for each one of the scissoring regions, to update scissor values for pixels within each one of the scissoring regions, wherein at least one of the pixel is covered by a plurality of the scissoring regions. wherein the scissor value, for the at least one pixel, indicates how many of the plurality of scissoring regions cover the at least one pixel, and wherein the processor is implemented at least partially by one or more hardware components; and
a memory to store the scissor values for the pixels.

18. A method comprising:
performing scissoring, with a hardware processing unit, for multiple scissoring regions in a sequential order, one scissoring region at a time; and
for each one of the scissoring regions, updating, with the hardware processing unit, scissor values for pixels within each one of the scissoring regions, wherein at least one of the pixels is covered by a plurality of scissoring regions. and wherein the scissor value, for the at least one pixel, indicates how many of the plurality of scissoring regions cover the at least one pixel.

19. The method of claim 18, wherein updating scissor values for pixels within each one of the scissoring regions comprises incrementing the scissor values for the pixels within each one of the scissoring regions.

20. The method of claim 18, further comprising:
removing one or more of the multiple scissoring regions; and
for each one of the one or more scissoring regions that is removed, decrementing scissor values for the pixels that are within the one or more removed scissoring regions if the scissor values are greater than zero.

21. The method of claim 18, further comprising:
comparing the scissor values for the pixels against a reference value; and
passing the pixels with scissor values equal to or exceeding the reference value.

22. The method of claim 18, further comprising:
passing the pixels within a region formed by union of the multiple scissoring regions.

23. The method of claim 18, further comprising:
passing the pixels within a region formed by intersection of at least two of the multiple scissoring regions.

24. An apparatus comprising:
means for performing scissoring for multiple scissoring regions in a sequential order, one scissoring region at a time; and
means for updating scissor values for pixels within each one of the scissoring regions, wherein at least one of the pixels is covered by a plurality of the scissoring regions, and wherein the scissor value, for the at least one pixel, indicates how many of the plurality of scissoring regions cover the at least one pixel, and
wherein the means for performing and the means for updating are implemented at least in part by one or more hardware components.

25. The apparatus of claim 24, further comprising:
means for comparing the scissor values for the pixels against a reference value; and
means for passing the pixels with scissor values equal to or exceeding the reference value.

26. The apparatus of claim 24, further comprising:
means for passing the pixels within a region formed by union of the multiple scissoring regions.

27. A non-transitory processor readable media for storing instructions that cause one or more hardware processors to:
perform scissoring for multiple scissoring regions in a sequential order, one scissoring region at a time; and
update scissor values for pixels within each one of the scissoring regions, wherein at least one of the pixels is covered by a plurality of the scissoring regions, and wherein the scissor value, for the at least one pixel, indicates how many of the plurality of scissoring regions cover the at least one pixel.

28. The non-transitory processor readable media of claim 27, and further for storing instructions that cause one or more hardware processors to:
compare the scissor values for the pixels against a reference value; and
pass the pixels with scissor values equal to or exceeding the reference value.

* * * * *